United States Patent [19]
Zendler et al.

[11] Patent Number: 6,044,517
[45] Date of Patent: Apr. 4, 2000

[54] APPARATUS FOR FILLING A WASHER FLUID RESERVOIR

[75] Inventors: Jeffrey D. Zendler, Pleasant Ridge; Vince Carnes, White Lake; William M. Buehrer, Walled Lake, all of Mich.

[73] Assignee: Chrysler Corporation, Auburn Hills, Mich.

[21] Appl. No.: 09/002,319

[22] Filed: Jan. 2, 1998

[51] Int. Cl.[7] .............................. B60S 1/50; B65B 39/04; B65B 3/18
[52] U.S. Cl. .................................... 15/250.01; 239/284.1; 141/59; 137/587; 137/588; 220/746; 220/86.2
[58] Field of Search ........................ 15/250.01, 250.001, 15/250.02; 239/284.1, 284.2; 137/587, 588; 141/59; 220/89.1, 562, 4.12, 4.13, 4.14, 745, 746, 747, 86.2

[56] References Cited

U.S. PATENT DOCUMENTS

| | | | |
|---|---|---|---|
| 2,139,476 | 12/1938 | Townsend | 137/588 |
| 3,838,713 | 10/1974 | Tubbs | 220/86.2 |
| 4,006,280 | 2/1977 | Walker et al. | 429/98 |
| 4,759,458 | 7/1988 | Fischer | 220/86.2 |
| 5,000,333 | 3/1991 | Petrelli | 239/284.1 |
| 5,327,946 | 7/1994 | Perkins | 141/59 |
| 5,553,912 | 9/1996 | Kubina et al. | 296/192 |

FOREIGN PATENT DOCUMENTS 2043727 12/1992 Canada ............................. 15/250.01

*Primary Examiner*—Gary K. Graham
*Attorney, Agent, or Firm*—James R. Yee

[57] ABSTRACT

An apparatus for filling a washer fluid reservoir of a rear wiper system includes a fill cup assembly having main body and a cover. The main body defines an opening for receiving washer fluid. A first conduit provides fluid communication between the opening and the washer fluid reservoir for the transfer of washer fluid. A second conduit allows for venting of the washer fluid reservoir back to the opening and provides complete exterior venting of fumes. A vent passage defined in part by the second conduit is blocked when the cover is rotated to a closed position. A designed-in interference normally retains the cover in its opened position.

22 Claims, 2 Drawing Sheets

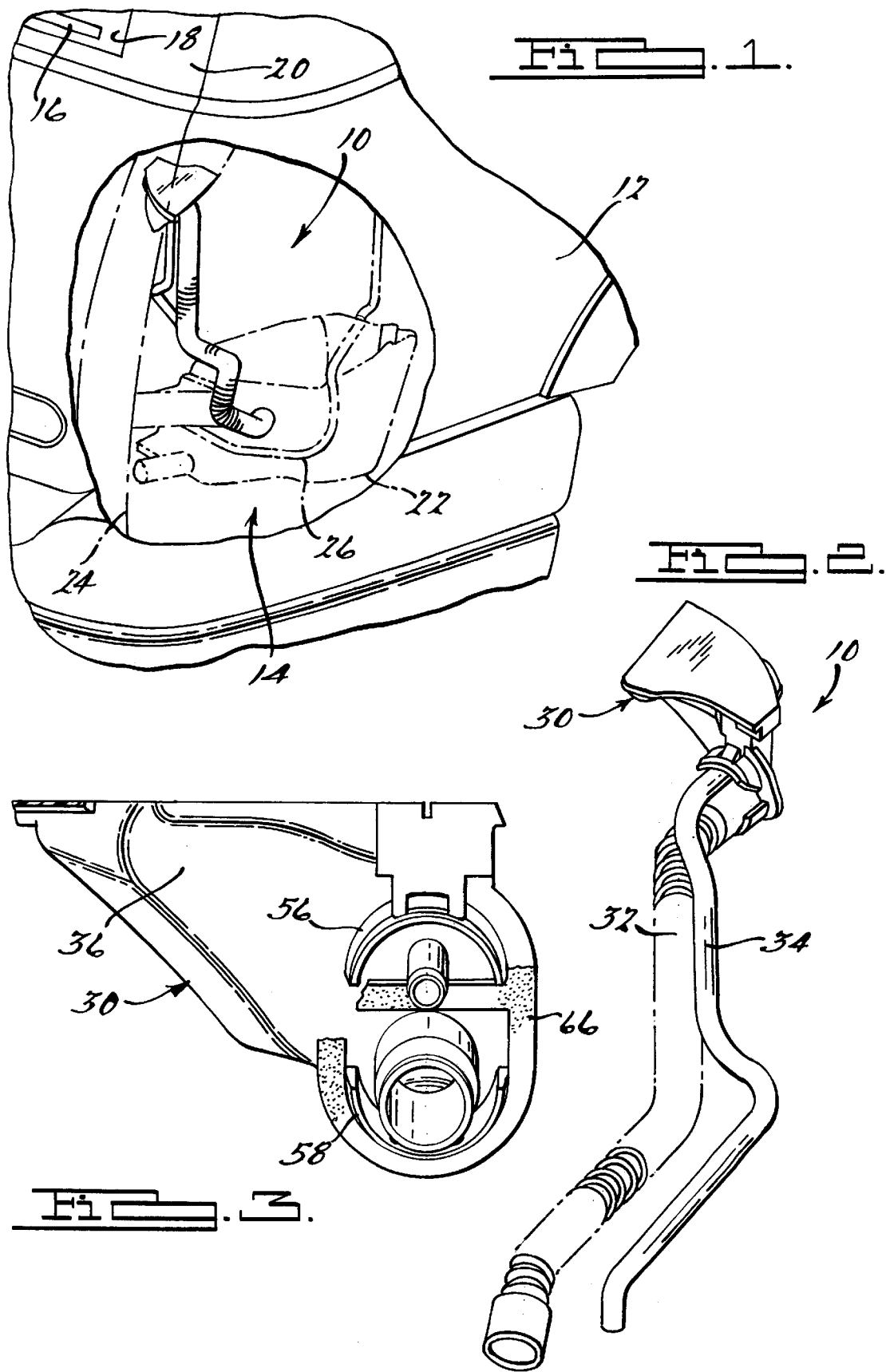

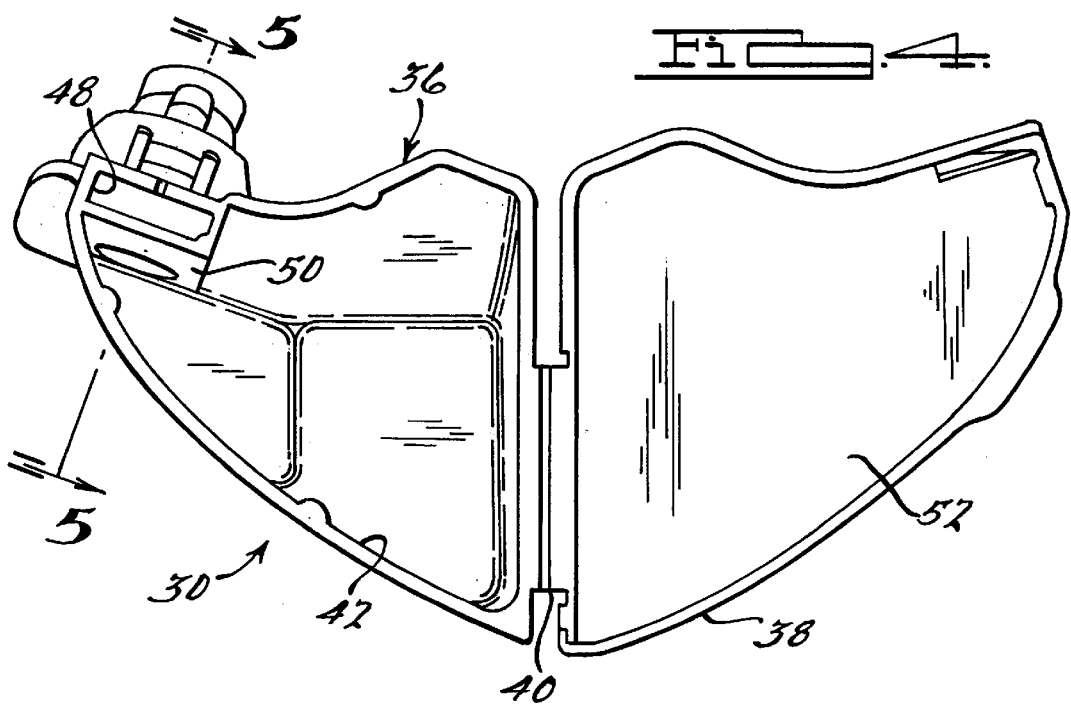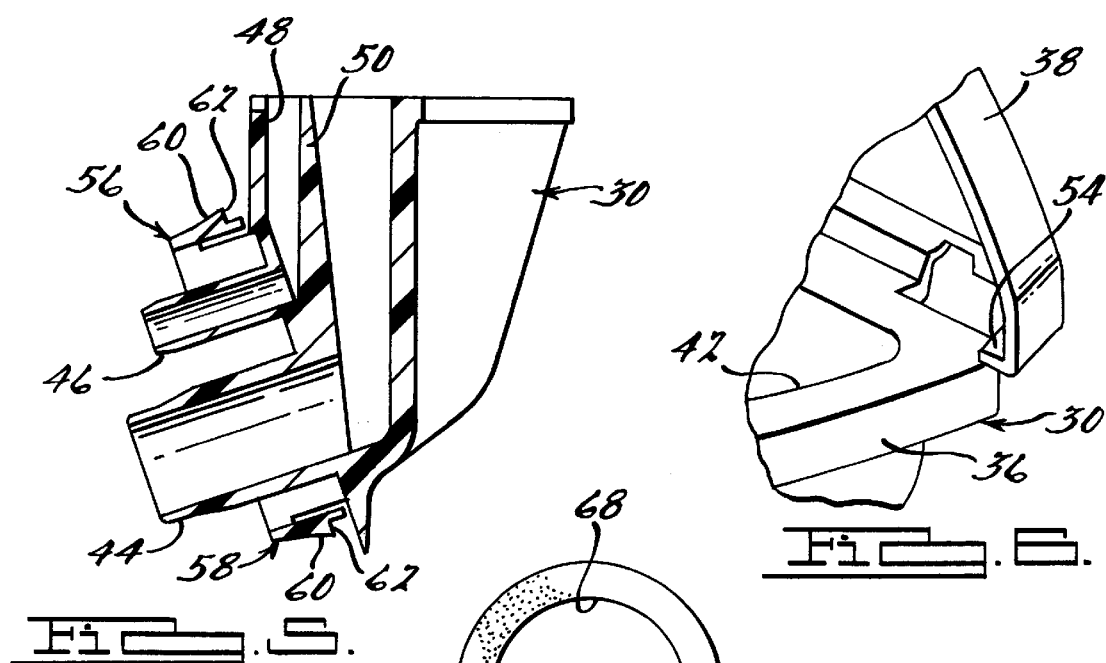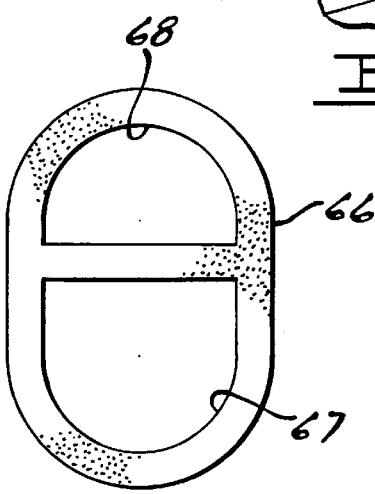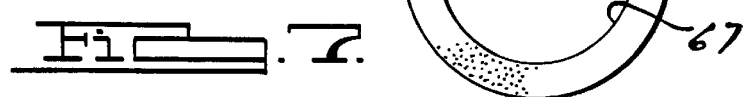

6,044,517

APPARATUS FOR FILLING A WASHER FLUID RESERVOIR

BACKGROUND OF THE INVENTION

1. Technical Field

The present invention generally relates to motor vehicles. More particularly, the present invention relates to an improved apparatus for filling a washer fluid reservoir of a motor vehicle.

2. Discussion

Modern motor vehicles are typically equipped with a single or a pair of windshield wiper assemblies. It is known to employ a window wiper assembly for cleaning rear windows of motor vehicles. For example, most utility vehicles, station wagons, minivans and the like incorporate a steeply sloped rear window equipped with a window wiper assembly. The rear windows of such vehicles are typically associated with a pivotally mounted liftgate or tailgate. Conventionally, these types of rear window wiper assemblies include a wiper blade operatively associated with the rear window and a fluid reservoir for supplying fluid for cleaning the rear window.

When the windshield wiper assembly is intended for cleaning the vehicle windshield, a fluid reservoir bottle is positioned under the hood and easily accessible for convenient refilling. Where the window wiper assembly is intended to clean a rear window of the vehicle, packaging considerations are significantly different. In this regard, the types of vehicles which typically employ rear wiper assemblies (e.g., utility vehicles, station wagons, minivans and the like) do not include trunks which would provide a convenient location for a washer fluid reservoir. It is known to remotely locate the washer fluid reservoir within a rear cargo area of the vehicle. While such arrangements have proven to alleviate certain packaging difficulties and operational inconveniences, they all remain associated with disadvantages. Primarily insofar as the present invention is concerned, prior known arrangements do not adequately ventilate the washer fluid reservoir upon refilling. In this regard, many known systems undesirably displace air from the washer fluid reservoir into the vehicle upon refilling. Additionally, known arrangements are time consuming and messy to fill since air displaced from the washer fluid reservoir is typically required to exit the same opening into which washer fluid is being introduced.

SUMMARY OF THE INVENTION

It is a general object of the present invention to provide an improved apparatus for filling a washer fluid reservoir of a motor vehicle.

It is a more particular object of the present invention to provide an apparatus for filling a washer fluid reservoir of a motor vehicle with improved venting of the reservoir.

In one form, the present invention provides an apparatus for filling a washer fluid reservoir of a motor vehicle wiper system with a washer fluid. The apparatus includes a fill cup for initially receiving the fluid. A first portion of the fill cup is in fluid communication with the washer fluid reservoir for delivering the fluid thereto. A second portion of the fill cup is in fluid communication with the washer fluid reservoir for venting air back to the fill cup.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIG. 1 is an environmental view of an apparatus for filling a washer fluid reservoir for a rear wiper system constructed in accordance with the teachings of a preferred embodiment of the present invention and shown operatively installed within a portion of an exemplary motor vehicle.

FIG. 2 is an enlarged perspective view of a fill cup assembly of the apparatus for filling a washer fluid reservoir of FIG. 1 removed from the exemplary motor vehicle for purposes of illustration and shown with the cover in its closed position.

FIG. 3 is a side view of the fill cup assembly of FIG. 2.

FIG. 4 is a top view of the fill cup assembly of FIG. 2 shown with the cover rotated 180 degrees from its closed position.

FIG. 5 is a cross-sectional view taken along the line 5—5 of FIG. 4.

FIG. 6 is a partial view of the fill cup assembly of FIG. 2 illustrating a designed-in interference operative to prevent the cover from inadvertently closing.

FIG. 7 is a view of the foam seal of FIG. 2 shown removed from the apparatus for purposes of illustration.

DETAILED DESCRIPTION OF THE PREFERRED EMBODIMENT

With initial reference to FIG. 1, an apparatus for filling a washer fluid reservoir constructed in accordance with the teachings of a preferred embodiment of the present invention is generally identified with reference numeral 10. The apparatus 10 is shown (in solid lines) operatively associated with a portion of an exemplary motor vehicle 12 within a cutaway portion of the vehicle 12. It will be understood that the particular arrangement shown in the environmental view of FIG. 1 is exemplary in nature and that the teachings of the present invention are not so limited.

Prior to addressing the construction and operation of the apparatus 10 of the present invention, a brief understanding of the cooperating components of the vehicle 12 is warranted. The apparatus 10 is specifically adapted for use with a rear wiper assembly 14. The rear wiper assembly 14 includes a rear wiper (partially shown at 16) operatively associated with a glass panel or window 18 of a pivotally mounted liftgate 20. The rear wiper assembly 14 includes a washer fluid reservoir 22 for storing a supply of washer fluid. While not specifically shown, it will be understood that the washer fluid reservoir 22 is mounted to the body of the vehicle 12 adjacent the D-pillar assembly 24. A conduit (partially shown at 26) provides fluid communication from the washer fluid reservoir 22 and a fluid outlet (not shown) operatively associated with the rear wiper 16. It will be understood that the manner in which fluid is pumped from the fluid reservoir 22 to the rear wiper assembly 14 is conventional in nature and need not be described.

With continued reference to FIG. 1 and additional reference to FIGS. 2–7, the apparatus 10 of the present invention will now be described in more detail. The apparatus 10 is shown to generally include a fill cup assembly 30 and first and second conduits 32 and 34 providing fluid communication between the fill cup assembly 30 and the washer fluid reservoir 22. The fill cup assembly 30 includes a main body portion 36 attached to a cover or lid 38 through a living hinge 40. The living hinge 40 permits the cover 38 to be moved between an open position (as shown in FIG. 4) and a closed position (as shown in FIG. 2).

The main body 36 of the fill cup assembly 30 defines an opening for the introduction of washer fluid into the rear wiper assembly 14. The main body 36 further includes a first port or washer fluid port 44 and a second port or vent port 46. In the exemplary embodiment illustrated, the opening 42 of the main body 36 downwardly tapers and functions as a funnel for delivering washer fluid to the washer fluid reservoir 22 which is remotely located. In this regard, the fluid port 44 is disposed at a lower end of the main body 36.

The first and second conduits or hoses 32 and 34 cooperate with the first and second ports 44 and 46, respectively, to provide fluid communication between the opening 42 of the fill cup assembly 30 and the washer fluid reservoir 22. In one application, the first and second conduits 32 and 34 are constructed of rubber or other suitable material and are frictionally retained on the first and second ports 44 and 46, respectively. Alternatively, while not preferred due to associated costs and labor, hose clamps or other known structure may be employed for securing the conduits 32 and 34 to the ports 44 and 46, respectively.

To provide means for venting air from the washer fluid reservoir 22 upon refilling, the second conduit 34 cooperates with the main body 36 of the fill cup assembly 30 to define a vent passage 48. The vent passage 48 is further defined by a wall segment 50 (shown most clearly in FIGS. 4 and 5) positioned within the opening 42 of the main body 36 such that the vent passage 48 opens adjacent an upper end of the opening 42. As such, the main body 36 can be completely filled with washer fluid during refilling of the washer fluid reservoir 22 without blocking the vent passage 48.

The apparatus 10 of the present invention further includes a cover seal 52 attached to the underside of the cover 38. The cover seal 52 is constructed from PVC foam or other suitable material and adhesively mounted to the cover 38. When the cover 38 is in its closed position, the cover seal 52 substantially closes the vent passage 48 and prevents fumes from escaping therethrough.

In the exemplary embodiment illustrated, the fill cup assembly 30 is unitarily constructed with an injection molding process. One suitable material for the fill cup assembly is polypropelene. However, other known materials may be employed. The fill cup assembly 30 is molded with the living hinge 40 and the cover 38 in fully opened positions (as shown in FIG. 4). As such, the cover 38 is inherently biased toward an opened position. The cover 38 is further maintained in its open position through a designed-in interference which is shown specifically in FIG. 6. As illustrated, a rear corner 54 of the cover 38 overlaps an adjacent portion of the main body 36 when the cover 38 is opened. When the cover 38 is moved toward its closed position, the rear corner 54 must be resiliently deflected.

As shown in the environmental view of FIG. 1, the fill cup assembly 30 is positioned on the exterior side of the D-pillar assembly 24 and is intended to be accessible upon opening of the liftgate 20. The first and second conduits 32 and 34 extend through an aperture (not shown) provided in the D-pillar assembly 24. To facilitate mounting of the apparatus 10 of the present invention to the D-pillar assembly 24, the fill cup assembly 30 is formed to include upper and lower mounting flanges 56 and 58 for cooperating with the opening in the D-pillar assembly 24. In the embodiment illustrated, the flanges 56 and 58 each include an inwardly deflectable clip 60 which carries a stop surface 62. The D-pillar reinforcement 24 is captured between the stop surfaces 62 and the main body 36 of the fill cup assembly 30.

With specific reference to FIGS. 3 and 7, the apparatus 10 of the present invention is further shown to include a mounting seal 66. The mounting seal 66 is generally oval in shape and preferably constructed from a closed cell foam or other suitable material. The seal 66 defines first and second openings 67 and 68 for receiving the first and second ports 44 and 46, respectively. The seal 66 is intended to be compressed between the main body 36 of the fill cup assembly 30 and the D-pillar assembly 24.

It is contemplated that the apparatus 10 of the present invention will be provided as a single assembly for installation into a motor vehicle 12 which requires no separate fasteners. In this regard, the first and second conduits 32 and 34 will be attached to the first and second ports 44 and 46, respectively, and the seal 66 will be operatively positioned adjacent the main body 36 prior to final vehicle assembly. During final vehicle assembly, the first and second conduits 32 and 34 are attached to suitable ports (not shown) on the washer fluid reservoir 22 and the fill cup assembly 30 is snapped into place on the D-pillar assembly 24. In this regard, the oppositely positioned clips 60 are compressed toward one another by the perimeter of the opening in the D-pillar assembly 24. Upon insertion of the flanges 56 and 58 into the D-pillar assembly opening, the clips 60 resiliently spring back and the stop surfaces 62 retain the fill cup assembly 30.

During use, an operator opens the rear liftgate 20 and pours washer fluid into the opening 42 of the fill cup assembly 30. Venting of air from the washer fluid reservoir 22 quickens the fill rate of the reservoir 22 and provides complete exterior venting of fumes. Upon completion, the cover 38 is closed and the cover seal 52 blocks the vent passage 48, thereby containing fumes from the washer fluid within the washer fluid reservoir 22. The fill cup assembly 30 further functions to provide a self-contained overflow for the washer fluid reservoir 22.

While the above description constitutes the preferred embodiment of the invention, it will be appreciated that the invention is susceptible to modification, variation, and change without departing from the proper scope or fair meaning of the accompanying claims.

What is claimed is:

1. An apparatus for filling a washer fluid reservoir of a motor vehicle rear wiper system with a fluid in combination with the motor vehicle, the motor vehicle including a pillar, the apparatus comprising:

a fill cup assembly having a main body portion defining a cavity for receiving fluid, the fill cup mounted to the pillar;

a first conduit in fluid communication with the cavity and the fluid reservoir for delivering the fluid from the cavity to the fluid reservoir; and a second conduit in fluid communication with the cavity and the fluid reservoir for venting air from the fluid reservoir back to the cavity; wherein the pillar is a D-pillar and the fill cup assembly includes at least one mounting flange extending through an aperture in the D-pillar.

2. The apparatus for filling a washer fluid reservoir of claim 1, wherein the fill cup assembly includes a cover hingedly attached to the main body portion for movement between an open position and a closed position such that the cover prevents vented air from escaping the apparatus when in the closed position.

3. The apparatus for filling a washer fluid reservoir of claim 2, wherein the fill cup assembly includes means for normally opposing movement of the cover from the open position to the closed position.

4. The apparatus for filling a washer fluid reservoir of claim 2, wherein the fill cup assembly includes a living hinge interconnecting the main body portion and the cover.

5. The apparatus for filling a washer fluid reservoir of claim 2, wherein the fill cup assembly is injection molded from plastic.

6. The apparatus for filling a washer fluid reservoir of claim 2, wherein the fill cup assembly further includes a wall segment in fluid communication with the second conduit, the wall segment and the second conduit defining a vent passage which opens substantially in a plane including an upper edge of the main body portion, an underside of the cover directly closing the vent passage when the cover is in the closed position.

7. The apparatus for filling a washer fluid reservoir of claim 1, wherein the cavity downwardly tapers.

8. The apparatus for filling a washer fluid reservoir of claim 1, wherein the first conduit is in fluid communication with a lower end of the cavity defined by the main body portion of the fill cup.

9. The apparatus for filling a washer fluid reservoir of claim 1, wherein the second conduit is in fluid communication with an upper end of the cavity defined by the main body portion of the fill cup.

10. The apparatus for filling a washer fluid reservoir of claim 1, wherein the at least one mounting flange includes an inwardly deflectable clip having a stop surface, a portion of the D-pillar captured between the stop surface and the main body portion.

11. An apparatus for filling a washer fluid reservoir with a fluid, the apparatus including:
 a fill cup assembly including a main body portion defining a cavity for initially receiving the fluid;
 a first fluid port in fluid communication with a lower portion of the cavity, the first fluid port adapted for transferring the fluid from the cavity to the washer fluid reservoir;
 a second fluid port which opens substantially in a plane including an upper edge of the main body portion, the second port adapted for routing vented air from the reservoir to the cavity; and
 a cover attached to the main body portion for movement between a first position and a second position, an underside of the cover directly closing the second fluid port when the cover is in the closed position.

12. The apparatus for filling a washer fluid reservoir of claim 11, wherein the fill cup assembly includes a wall segment disposed in the cavity at least partially defining the second fluid port.

13. An apparatus for filling a washer fluid reservoir of a motor vehicle wiper system with a fluid in combination with the motor vehicle, the apparatus comprising:
 a fill cup assembly having a main body portion defining a cavity for receiving fluid, the fill cup mounted to the vehicle, the fill cup assembly including a wall segment in fluid communication with the second conduit, the wall segment and the second conduit defining a vent passage which opens substantially in a plane including an upper edge of the main body portion;
 a first conduit in fluid communication with the cavity and the fluid reservoir for delivering the fluid from the cavity to the fluid reservoir;
 a second conduit in fluid communication with the cavity and the fluid reservoir for venting air from the fluid reservoir back to the cavity; and
 a cover hingedly attached to the main body portion for movement between an open position and a closed position such that the cover prevents vented air from escaping the apparatus when in the closed position, an underside of the cover directly closing the vent passage when the cover is in the closed position.

14. The apparatus for filling a washer fluid reservoir of claim 13, wherein the motor vehicle includes a D-pillar, the fill cup being mounted to the D-pillar.

15. The apparatus for filling a washer fluid reservoir of claim 14, wherein the fill cup assembly includes at least one mounting flange extending through an aperture in the D-pillar.

16. The apparatus for filling a washer fluid reservoir of claim 15, wherein the at least one mounting flange includes an inwardly deflectable clip having a stop surface, a portion of the D-pillar captured between the stop surface and the main body portion.

17. The apparatus for filling a washer fluid reservoir of claim 13, wherein the cavity downwardly tapers.

18. The apparatus for filling a washer fluid reservoir of claim 13, wherein the first conduit is in fluid communication with a lower end of the cavity defined by the main body portion of the fill cup.

19. The apparatus for filling a washer fluid reservoir of claim 13, wherein the second conduit is in fluid communication with an upper end of the cavity defined by the main body portion of the fill cup.

20. The apparatus for filling a washer fluid reservoir of claim 13, wherein the fill cup assembly includes means for normally opposing movement of the cover from the open position to the closed position.

21. The apparatus for filling a washer fluid reservoir of claim 13, wherein the fill cup assembly includes a living hinge interconnecting the main body portion and the cover.

22. The apparatus for filling a washer fluid reservoir of claim 13, wherein the fill cup assembly is injection molded from plastic.

* * * * *